CLASS OF SERVICE TELEPHONE SYSTEM
Filed June 25, 1962
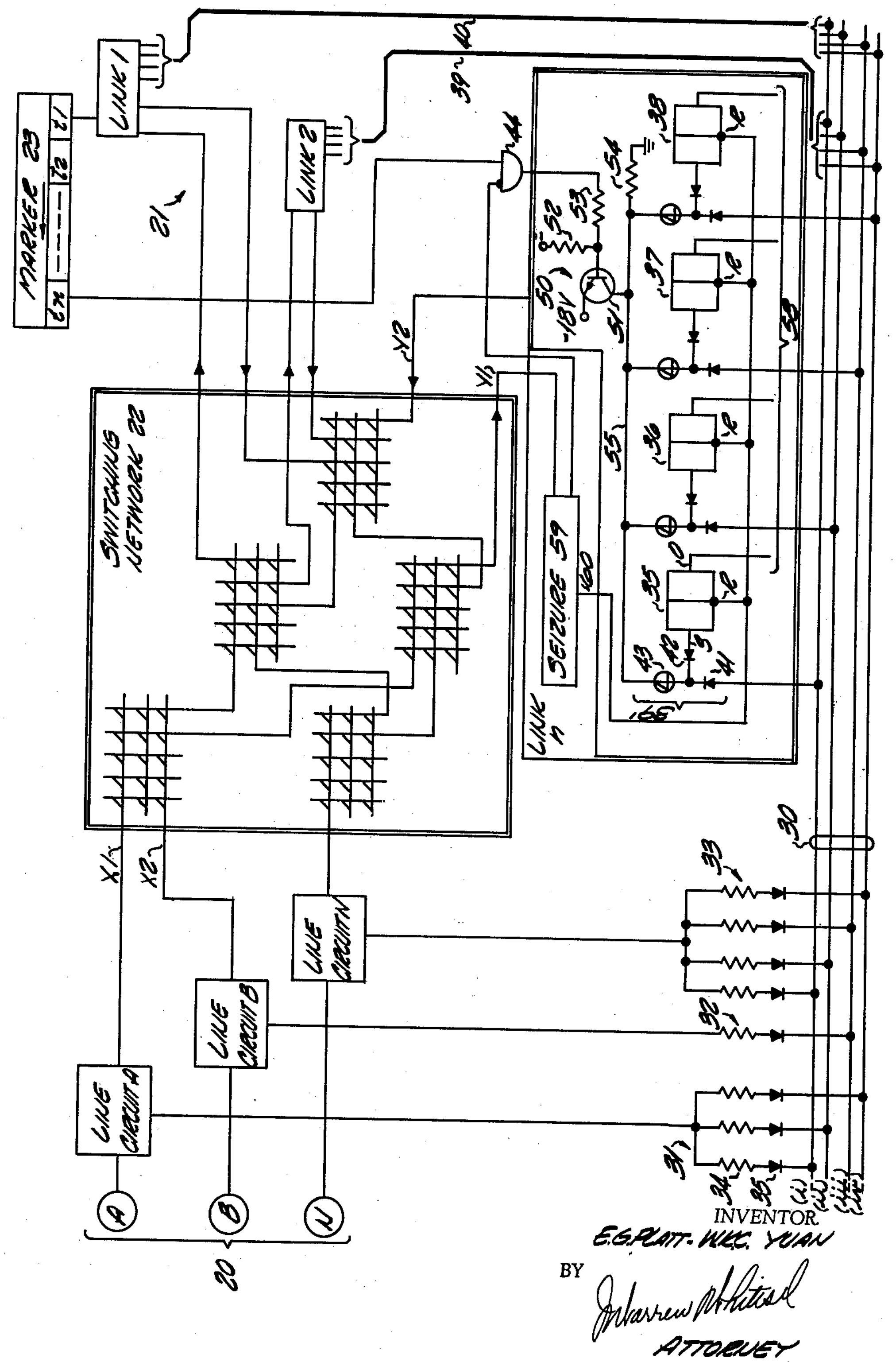
INVENTOR
E.G.PLATT - W.K.C. YUAN
BY
J. Warren Whitesel
ATTORNEY

United States Patent Office 3,133,157

Patented May 12, 1964

3,133,157

CLASS OF SERVICE TELEPHONE SYSTEM

Eric G. Platt, Worth, and William K. C. Yuan, La Grange, Ill., assignors to International Telephone & Telegraph Corporation, New York, N.Y., a corporation of Maryland Filed June 25, 1962, Ser. No. 204,807
5 Claims. (Cl. 179—18)

This invention relates to electronic switching telephone systems and more particularly to means for giving various classes of service in such systems.

The invention is described in connection with a telephone system disclosed in a co-pending application; although the invention may be used in other systems also. That co-pending application is entitled "Electronic Switching Telephone System," S.N. 113,178, filed May 29, 1961, by Seemann and Haskins and assigned to the assignee of this invention.

Usually telephone rates vary according to the class of service that is given. For example, rates may be relatively low when service is restricted to a given area, calls are restricted to a limited time duration, a number of parties share a line, or the like. Conversely, rates may be relatively high when unlimited service is given to a single party line.

Regardless of why service is or is not restricted, switching equipment must recognize distinctive class of service indicating characteristics of each line if completely automatic service is to be given. In most electronic switching systems, these indications are given by marking pulses coordinated with the particular time frames, among a large number of time frames, which correspond to a particular subscriber line. The class of service given to other subscriber lines is indicated by marking pulses coordinated with the time frames that identify those other lines. This type of class of service marking depends upon a time base identification of subscriber lines which may, in turn, be justified only when the telephone system is relatively large.

Accordingly, an object of this invention is to provide new and improved class of service telephone systems. In particular, an object is to provide class of service telephone systems which do not depend for class of service identification upon either subscriber line numbers or time base generators. In this connection, an object is to provide a class of service system which is simple enough to use with the smallest telephone system and yet expandable to use with the largest telephone system.

A further object is to provide for a great number of classes of service. Here an object is to provide a system which may begin with a limited number of classes of service and then be expanded to provide a great number of classes of service as system needs increase. Still another object is to provide a class of service system which is compatible with most existing telephone equipment so that class of service equipment may be added thereto, either at once or gradually as required. Thus, an object is to provide a class of service applique circuit which may be added to existing systems at a minimum cost and with a minimum amount of modification to the existing systems.

Yet another object is to give various classes of service in electronic switching telephone systems. Here an object is to give such service in a system that uses a self-seeking, current controlled, PNPN diode switching network. A more particular object is to provide a class of service circuit using PNPN diodes which fail to meet the specification of diodes used in the switching network. In this connection, an object is to reduce the overall cost of PNPN diodes by utilizing diodes which would otherwise be rejects. Finally, an object is to provide a circuit which accomplishes these aims in the above described electronic switching system and yet is usable with many other types of systems also.

In accordance with one aspect of this invention, each subscriber line in a telephone system is given a particular one (or several) of many classes of service. In greater detail, a plurality of common busses extend from the subscriber lines to control or link circuits used to establish and maintain a call. A diode network interconnects each line with a selected bus or group of busses, the selected connections being made according to the distinctive characteristics of the line (e.g. one connection for restricted service, one for executive right of way, etc.). In each control or link circuit, a bistable device is connected to each of the common busses. Thus, the bistable devices switch to one or the other of their stable states depending upon the electrical signals applied from a line through its individual diode network to the busses. The control or link circuit responds to a combination or code in which the bistable devices operate to provide a particular class of service.

The above mentioned and other features of this invention and the manner of obtaining them will become more apparent, and the invention itself will be best understood by reference to the following description of an embodiment of the invention taken in conjunction with the accompanying drawings, in which:

The single sheet of drawing is a block and logic circuit showing an exemplary telephone system with an applique circuit for giving any of a number of classes of service.

The telephone system of the drawing includes a plurality of subscriber lines 20, a plurality of control or link circuits 21, and a self-seeking, current controlled, PNPN diode switching network 22 for selectively interconnecting the lines and links.

Each subscriber line terminates in an individually associated line circuit. For example, line A terminates in line circuit A, line B in line circuit B, and line N in line circuit N.

The links are time enabled (i.e. a link may originate or complete a call only during a time frame which identifies that link). That is, a marker 23 provides time base control signals in the form of a plurality of cyclicly recurring time frames. Each time frame identifies and enables a corresponding link. For example, time frame $t_1$ identifies and enables link 1; time frame $t_2$ identifies and enables link 2; time frame $t_n$ identifies and enables link $n$. Any number of links and time frames may be provided.

The marker may take any convenient form. However, reference is here made to a co-pending application for an example of one marker which provides good results. That co-pending application is entitled "Ring Counter and Marker," S.N. 183,859, filed March 30, 1962 by William K. C. Yuan and assigned to the assignee of this invention. The details of the links are shown in the above identified Seemann-Haskins application. The details of the PNPN diode network are shown in a co-pending application entitled "Electronic Switching Telephone System," S.N. 17,003, filed March 23, 1960 by Virgle E. Porter and assigned to the assignee of this invention.

In carrying out this invention, an applique circuit is provided to convey signals from the lines to the links, the signals designating the distinctive characteristics of the lines. The links respond to give a particular class of service responsive to these signals. It should be understood that the terms "distinctive characteristics" and "class of service" are to be construed broadly. For example, these terms could refer to billing or rate determination, as mentioned above. They could also refer to such things as party identification, executive right-of-way, abbreviated dialing, and other services given in commercial systems. Or they could refer to other special services which can be built into a system.

The applique circuit includes a plurality of common busses 30 which run between the line circuits 20 and the link circuits 21. A diode network connects each line circuit to certain of the busses in accordance with the distinctive characteristics of lines. For example, a diode network 31 connects line circuit A to conductors (i), (ii), and (iv) of the common busses 30. In similar manner, diode network 32, connects line circuit B to conductor (iii), while network 33 connects line circuit N to conductors (i)–(iv). Each connection includes a current limiting resistor and an isolating diode, as shown at 34, 35, for example.

To illustrate and explain the diode connections, assume that the subscriber served by line A pays a monthly telephone bill at a rate based on a limited number of calls each month, conversation timing, and restricted access to trunk lines; therefore, line A is connected to busses (i), (ii), (iv). Line B may have no restrictions, but may be given executive right-of-way service; therefore, line B is connected to bus (iii). Line N may have all restrictions plus executive-right-of-way; therefore, line N is connected to all busses. The foregoing illustration is, of course, a simplified disclosure which is suggested to help explain circuit operations. In actual practice the diode networks may be wired in binary code to provide a great number of classes of service. As those familiar with binary coding know, the four common busses here shown may provide up to $2^4$ or a number of sixteen classes of service. If more classes are required, more common busses may be provided. If less classes are required, less busses may be provided.

Each link includes a number of time controlled bistable or flip-flip circuits individually connected to the busses 30. Thus, link $n$ is shown as including four bistable or flip-flip circuits 35–38 because there are four busses. The conductors 39, 40 indicate similar connections between the busses 30 and bistable or flip-flip circuits (not shown) in links 2 and 1 respectively.

Each flip-flip is a bistable circuit adapted to remove or apply an output signal depending upon which of two input signals occurred last. Consider the flip-flip circuit 35 by way of example. It has a "set" terminal S, a "reset" terminal R, and an output terminal O. If the set terminal S was last energized, the output terminal O is energized. If the reset terminal R was last energized, the output terminal O is de-energized. The circuit 35 set terminal S is pulsed from a connected line circuit via the common bus (i) and a trigger circuit 39' in the link. The trigger circuit includes an isolating diode 41, a blocking diode 42, and a PNPN diode 43. The isolating diode 41 prevents feedback between the various link circuits via bus (i). The blocking diode 42 prevents the positive bus potential from reaching the set terminal S and the PNPN diode 43 provides a bistable time controlled operation. The set terminals of the flip-flip circuits 36–38 connect to corresponding busses via similar trigger circuits, e.g., the set terminals of flip-flips 36–38 connect to the common busses (ii)–(iv) respectively.

Means are provided for giving the indicated class of service responsive jointly to the signals on the common busses and to the time base signals produced by the marker. That is, normally all flip-flip circuits are reset so that their output conductors "O" are de-energized. To switch "on" the flip-flip and energize the output conductor "O," there must be a coincidence between a line circuit marking on a bus and a time frame pulse that identifies the link assigned to complete a call. Mor particularly, it may be recalled that the link $n$ is identified and enabled by the time frame $t_n$ generated by the marker 23. This time frame is defined by a pulse which energizes an inhibit gate 44. The gate 44 output is of positively polarity and operates an electronic switch 50. This switch includes an NPN, junction type, semiconductor device 51 of any suitable design—a transistor, for example. The emitter of the transistor 51 is permanently biased to a −18 volt potential by any suitable source such as a battery. The base of the transistor 51 is biased from a voltage divider 52, 53. The collector is connected to ground via a load resistor 54. During time periods when the $t_n$ pulse is not present, a negative potential applied through the resistor 52 makes the base of transistor 51 negative relative to its emitter. The transistor is switched "off." When the $t_n$ pulse appears, the base of transistor 51 goes positive relative to its emitter, and it switches "on."

When the transistor 51 switches "on," practically the full −18 volt potential of the emitter battery appears on the conductor 55. If one of the common busses 30 is then marked by a positive potential, the corresponding PNPN diode switches "on." For example, if bus (i) is marked, the diode 43 switches "on." Then practically the full −18 volts on conductor 55 passes through the diode 42 to switch the flip-flip circuit 35 to energize the output conductor O. The diodes in other links, such as 41, block passage of the −18 volts to other flip-flip circuits via the bus (i). If any other of the busses 30 are marked, the corresponding PNPN diodes fire and the flip-flips also switch to energize their output conductors. The combination of potentials on the output conductors 58 are decoded in any suitable manner to provide the indicated class of service in link $n$. For example, the output of the flip-flip circuit 35 could pulse a call meter.

All of the flip-flip circuits are reset to de-energize their output conductors when the link is seized. For example, when line $n$ is seized, a circuit 59 responds in any manner to pulse its output terminal 60. This pulse appears at the reset terminal R of each flip-flip causing it to de-energize its output terminal.

The system operates this way. A calling subscriber station, A for example, goes off-hook. The line circuit A recognizes this as a request for service and energizes the point X1 on switching network 22. At this instant, the marker 23 is pulsing a link circuit (e.g. link $n$ via gate 44, for example). Link $n$ energizes the point Y1, as described in the above identified Seemann-Haskins application.

When the potentials appear at poins X1, Y1, a path finds its way through the network 22. The seizure circuit 59 pulses all reset terminals R and all flip-flips return to normal. After this reset pulse disappears, any flip-flips 35–38 connected to an energized bus 30 energizes its output terminal. For example, on calls from line A, the flip-flip circuits 35, 36, and 38 are switched "on." Next the line circuit A de-energizes the common busses 30.

The link $n$ receives and stores digit pulses which identify the called line. This identification is compared with the output potentials on conductors 58 to determine whether any restrictions will prevent completion of the call. If not points X2 and Y2 are marked from the link $n$ (assuming that line B is called). A path now finds its way from point X2 through the network 22 to point Y2. Then, link $n$ interconnects points Y1, Y2 to complete the speech path. It might be noted that the common busses 30 are completely separate from the speech path and any sleeve or other control conductors which might be associated with such speech path.

During the call, the link $n$ may give any required special service according to the markings extended over the busses 30, and repeated over the conductors 58. The call is released when the parties hang up. The flip-flips are re-set when the next call is extended to point Y1.

If two subscribers go off-hoook at the same instant, false markings could appear on conductors 30. However, this is not objectional in electronic switching systems of the type described because paths fire through the network 22 in approximately fifteen microseconds and simultaneous calls almost never occur within this short time period. If two or more calls should appear simultaneously, a call may be lost or a connection may be made to an incorrect party. But, the grade of service in the above identified Seemann-Haskins systems is so great that these rare misconnections are not objectional. In other systems which do not give such a high grade service, it may be desirable to add a chain circuit extending through all line circuits to prevent more than one line circuit from energizing the conductors 30 at any given time. This will slow the operation somewhat but will not be objectional, because if the switching system is so slow that a chain circuit is desirable, there will be enough time to send many class of service signals at electronic speeds while a call is being established.

Upon reflection, it will be seen that the invention provides an extremely flexible class of service applique circuit. It may be added to existing equipment at a minimum cost and with a minimum amount of modification. Moreover, it may be adapted to large or small telephone systems by the expedient of adding flip-flip circuits and diode networks at each link and line circuit. This addition may be either at once or gradually as the need arises. In addition, the applique circuit makes non-critical use of PNPN diodes. Thus, the invention reclaims, otherwise reject diodes manufactured for, but not usable in, the switching network. This lowers the overall cost of PNPN diodes. Finally, the applique circuit is not limited to use with the PNPN diode system described above, but may be used with a great variety of systems.

While the principles of the invention have been described above in connection with specific apparatus and applications, it is to be understood that this description is made only by way of example and not as a limitation on the scope of the invention.

We claim:

1. A telephone system comprising a plurality of subscriber lines, a plurality of links for controlling the interconnection of said lines, a predetermined number of busses common to said lines and links, means responsive to an off-hook condition on one of said lines for selectively marking certain of said common busses during a fixed period of time, the busses that are marked corresponding to the class of service given to the off-hook line that marks said busses, a source of time frames which sequentially identify and enable said links, a plurality of bistable circuits there being said predetermined number of bistable circuits in each of said links circuits, means for individually connecting each of said bistable circuits to a corresponding one of said common busses, and means responsive to a coincidence between a marking on any of said busses and a time frame identifying one of said links for switching any bistable circuit connected to a marked bus in the link identified by that time frame.

2. A telephone system comprising a plurality of line circuits, a plurality of common busses, a diode network individually connecting each of said line circuits to certain of said busses, said connections being completed from any line to said busses in accordance with the distinctive characteristics of such line, means comprising a plurality of time controlled bistable circuits connected to said busses, means responsive to a condition in a line circuit for briefly marking said busses via said diode network, and means in the bistable circuits then identified by said time control for causing an electrical response indicated by the markings then being applied to said busses.

3. A class of service circuit for use in a telephone system comprising means associated with each subscriber line in said system for transmitting a coded signal which identifies the class of service given to such line, means for controlling the extension of calls through said system responsive to time base signals, means separate from the speech path and control conductors immediately associated therewith for transmitting said coded signals to said control means, and means jointly responsive to a coincidence of said coded signals and said time base signals for giving the class of service identified by said code, whereby the numbers of classes of service given is limited only by the number of codes available.

4. A telephone system comprising a plurality of subscriber lines and a plurality of link circuits, a self-seeking current controlled, PNPN diode switching network for selectively interconnecting said lines and links, a plurality of busses common to said lines and links, means associated with each of said lines for selectively marking said busses to indicate a distinctive characteristic of said lines, and means associated with said links for identifying said markings applied to said busses and giving a particular class of telephone service identified by said distinctive characteristics.

5. An electronic switching telephone system comprising a plurality of subscriber lines, each being terminated by a line circuit, a self-seeking current controlled PNPN diode network for interconnecting said lines, a plurality of time identified link circuits for controlling the extension of calls between said lines through said network, means common to all said line and link circuits for extending class of service signals from a calling one of said lines to a particular one of said links assigned to serve said calling line, said signal being extended during the time when one of said links is identified, and means in said link responsive to said signal for giving the class of service identified by said signal.

No references cited.